(12) United States Patent
Schlipf

(10) Patent No.: US 10,993,290 B2
(45) Date of Patent: *Apr. 27, 2021

(54) ELECTRIC HEATER WITH CLAMPING JACKET

(71) Applicant: TÜRK & HILLINGER GMBH, Tuttlingen (DE)

(72) Inventor: Andreas Schlipf, Tuttlingen (DE)

(73) Assignee: TÜRK & HILLINGER GMBH, Tuttlingen (DE)

( * ) Notice: Subject to any disclaimer, the term of this patent is extended or adjusted under 35 U.S.C. 154(b) by 121 days.

This patent is subject to a terminal disclaimer.

(21) Appl. No.: 16/358,120

(22) Filed: Mar. 19, 2019

(65) Prior Publication Data

US 2019/0215912 A1 Jul. 11, 2019

Related U.S. Application Data

(63) Continuation of application No. 15/160,493, filed on May 20, 2016, now Pat. No. 10,342,072.

(51) Int. Cl.
  *H05B 3/46* (2006.01)
  *B29C 45/27* (2006.01)
  *H05B 3/42* (2006.01)
  *H05B 1/02* (2006.01)

(52) U.S. Cl.
  CPC ........... *H05B 3/46* (2013.01); *B29C 45/2737* (2013.01); *H05B 1/0291* (2013.01); *H05B 3/42* (2013.01); *B29C 2045/2745* (2013.01); *H05B 2203/014* (2013.01)

(58) Field of Classification Search
  CPC ... H05B 3/46; H05B 3/42; H05B 3/40; H05B 2203/014; H05B 1/0291; B29C 45/2737; B29C 45/30; B29C 45/74; B29C 2045/2745; B29C 2045/2743; B22D 17/2038
  See application file for complete search history.

(56) References Cited

U.S. PATENT DOCUMENTS

2017/0241582 A1* 8/2017 Hackel ............... H05B 3/04

* cited by examiner

*Primary Examiner* — Shawntina T Fuqua
(74) *Attorney, Agent, or Firm* — McGlew and Tuttle, P.C.

(57) ABSTRACT

An electric heater (100) with an axial opening (131) for receiving an object to be heated, with an electric heating element (130) surrounding the axial opening (131) in at least in some sections and with an essentially cylindrical or essentially frustoconical clamping jacket (110) surrounding the electric heating element (13) at least in the radial direction for generating an adjustable force acting radially in the direction of an axis (A) of the axial opening (131). The clamping jacket (110) is a multipart clamping jacket and has at least one pressing segment (113, 114) for introducing the force acting radially in the direction of an axis (A) of the axial opening (131) as well as at least one clamping segment (111, 112), with which the width of the gap (119a, 119b) between adjacent edges of oppressing segments (113, 114) can be varied for adjusting the force acting radially in the direction of an axis (A) of the axial opening (131) by moving the clamping segment (111, 112) relative to the pressing segment (113, 114).

20 Claims, 11 Drawing Sheets

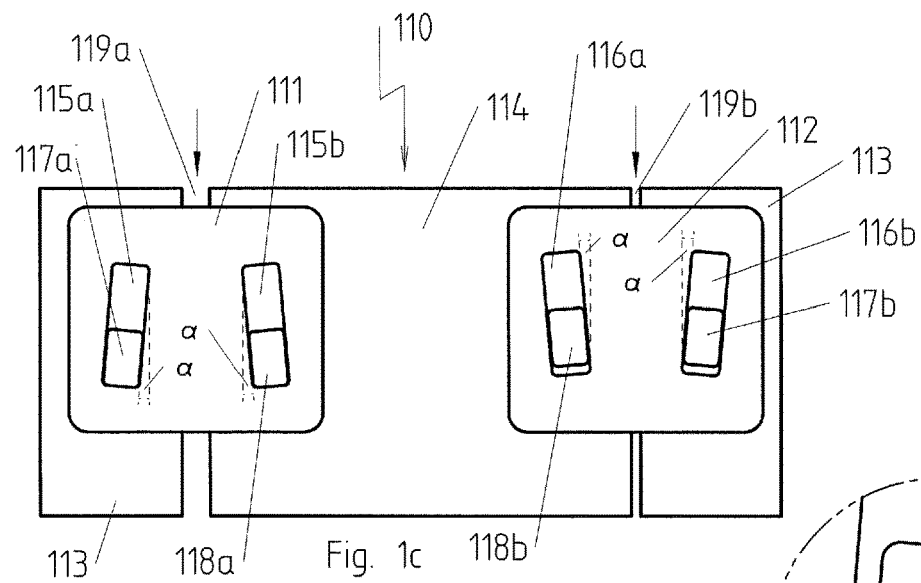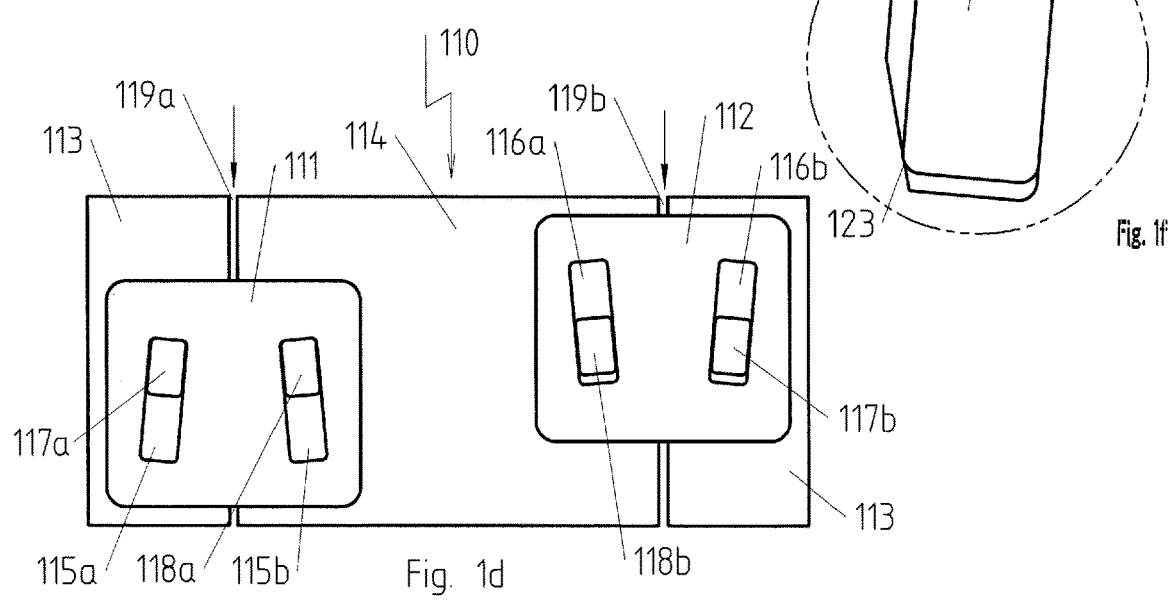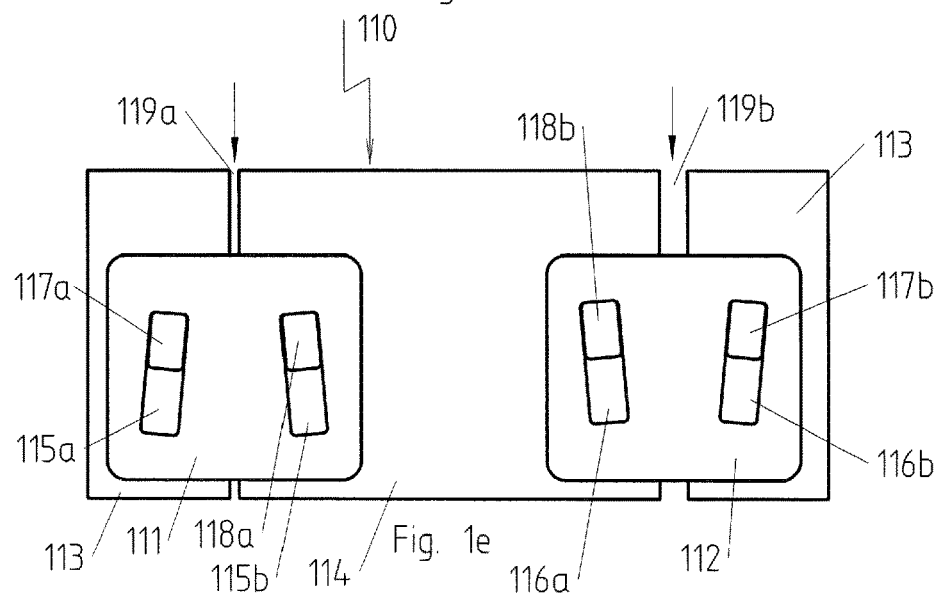

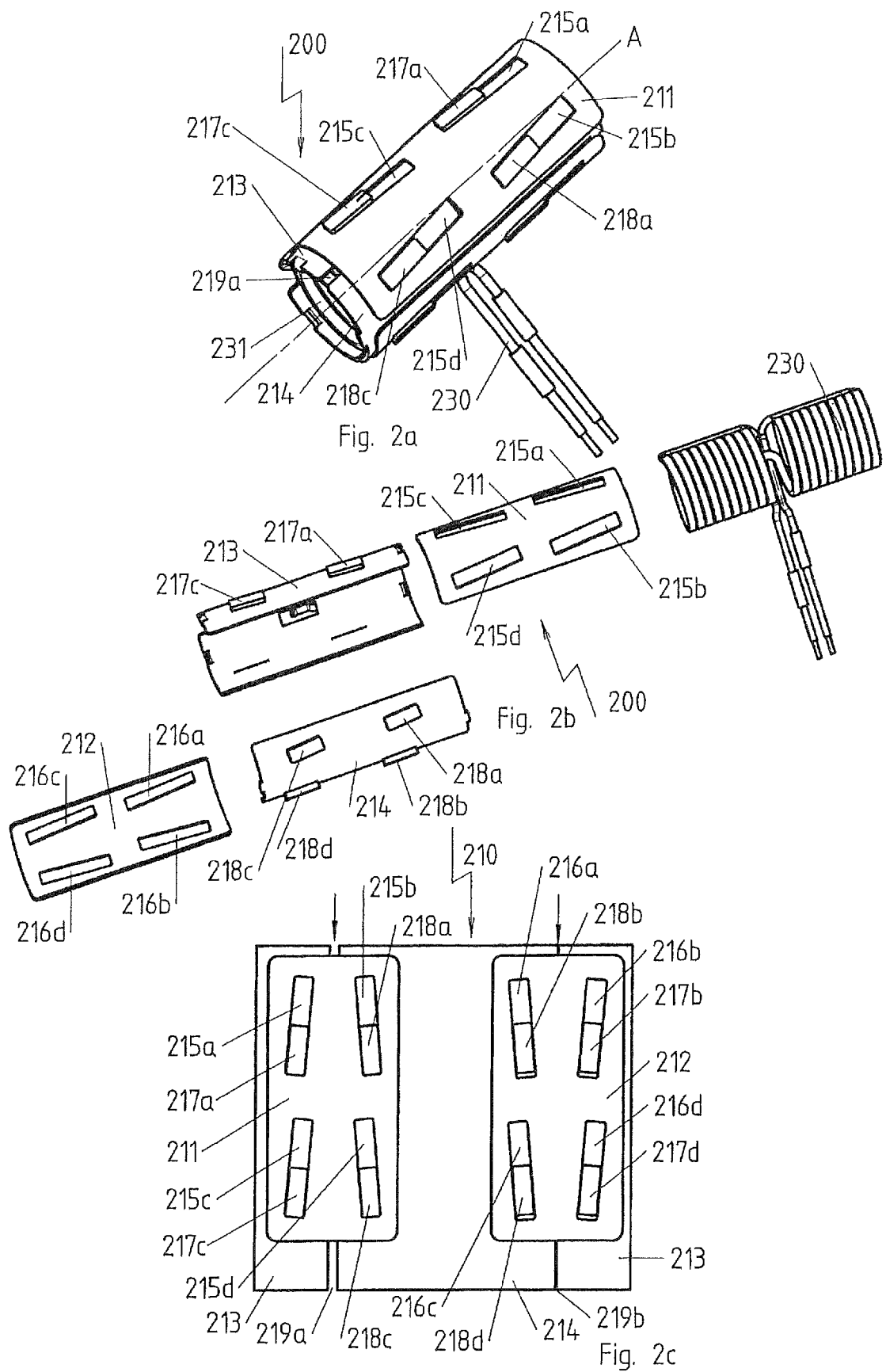

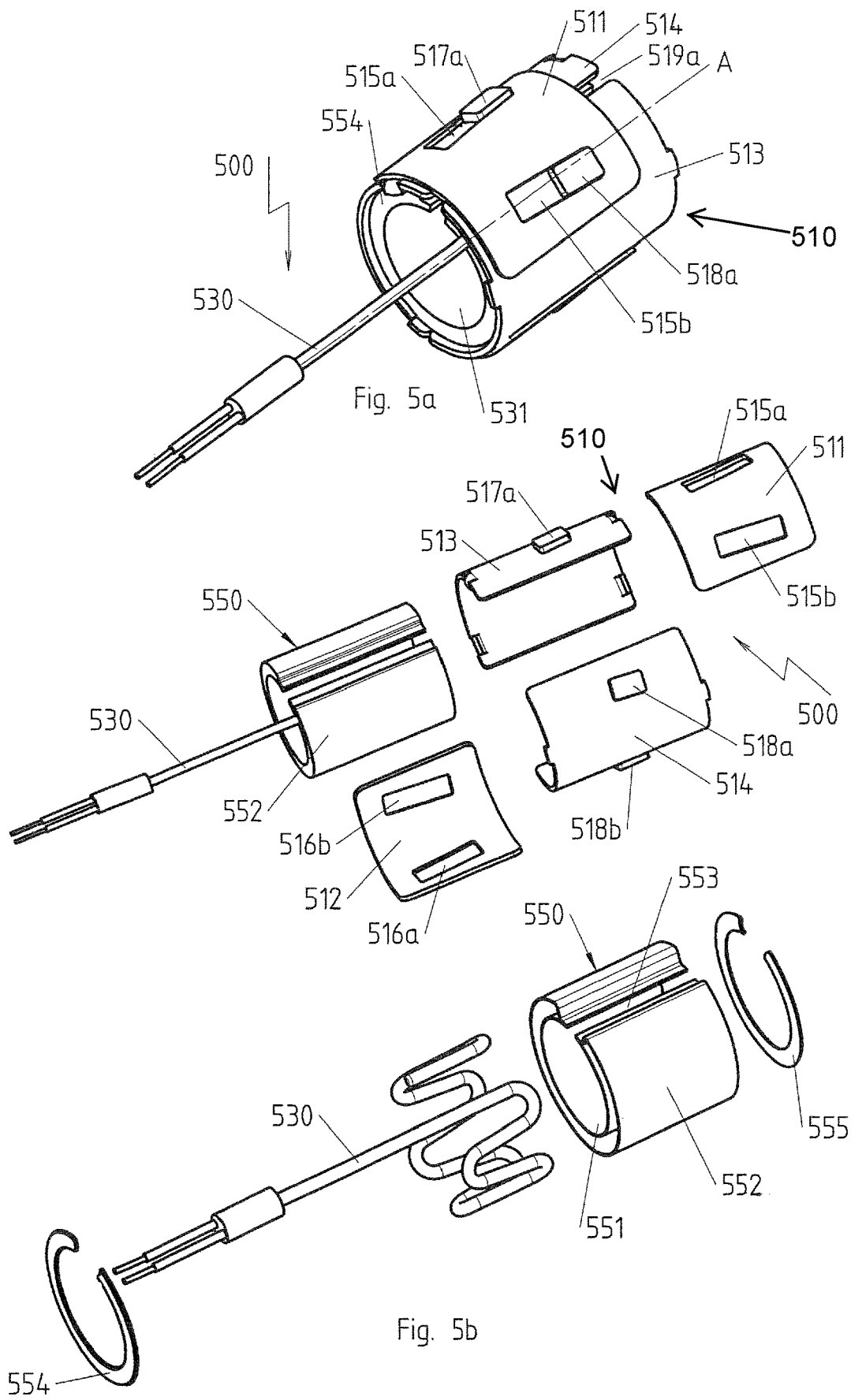

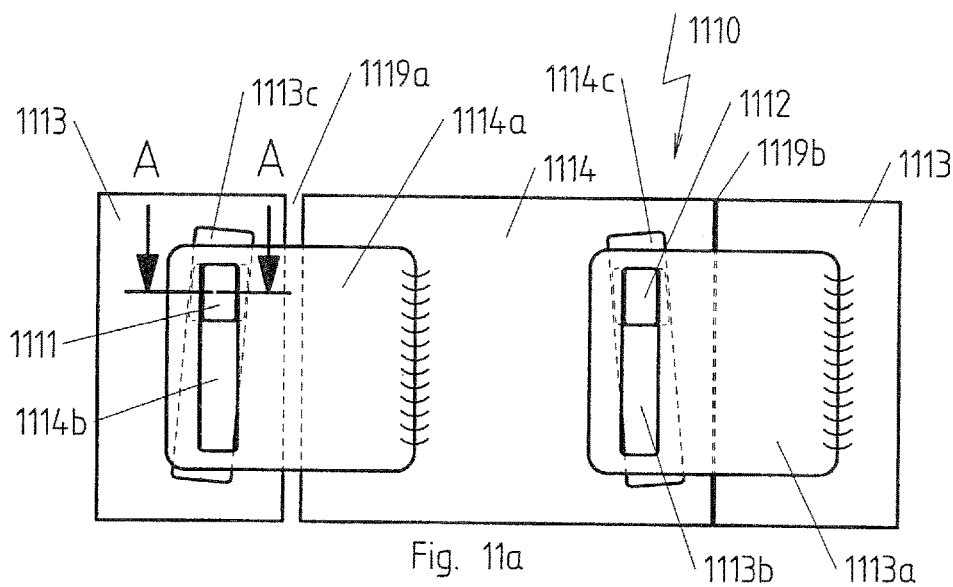
Fig. 11a
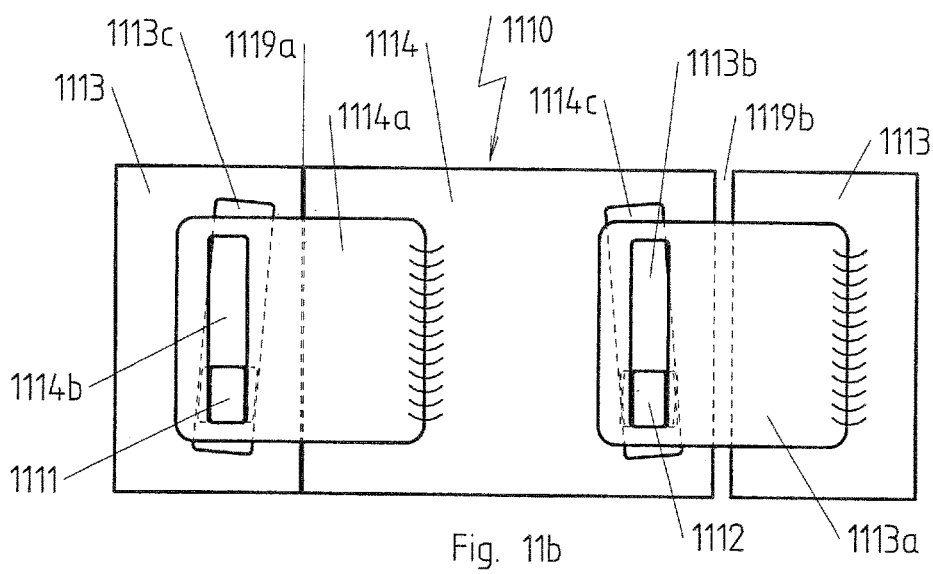
Fig. 11b
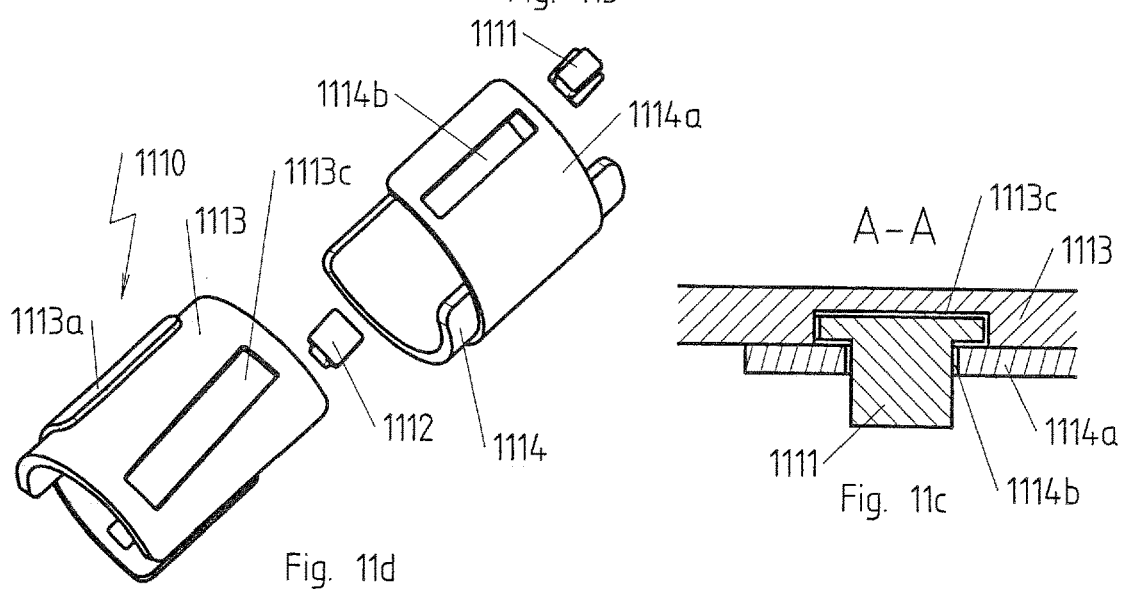
Fig. 11c
Fig. 11d

ELECTRIC HEATER WITH CLAMPING JACKET

CROSS REFERENCE TO RELATED APPLICATIONS

This application is a continuation under 37 CFR 1.53(b) of pending prior U.S. patent application Ser. No. 15/160,493 filed May 20, 2016, which claims the priority of German Patent Application 20 2015 102 778.8 filed May 29, 2015, the entire contents of each application are incorporated herein by reference.

FIELD OF THE INVENTION

The present invention relates to an electric heater.

BACKGROUND OF THE INVENTION

Heaters with an electric heating element, which are pushed over a body to be heated and are fixed there by clamping, are known from the state of the art. For example, such heaters are used in injection molding machines or in hot runner and distributor systems as a nozzle heater for heating nozzle bodies.

It is already known from the commercially available state of the art that a one-piece clamping jacket, which is in direct contact with the heating element or, e.g., if the heating element is embedded between an inner metal jacket and an outer metal jacket, is in indirect contact with the heating element, and which clamping jacket has, when viewed in the radial direction, mutually overlapping sections, between which a wedge mechanism operated with a screw is arranged, is provided around the heating element. If the screw is turned in one direction, the wedge mechanism is moved such that its height changes, which leads to an increase in the distance of the overlapping sections of the clamping jacket and leads to fixing of the heater on the body to be heated because of the essentially constant length of the clamping jacket. The turning of the screw in the other direction makes it possible again to loosen the clamping jacket.

The increased space requirement of the clamping mechanism in the radial direction due to the wedge mechanism is problematic in this heater with clamping jacket, because the individual nozzles to be heated are arranged in blocks in many cases, especially in hot runner nozzles, and there is only a relatively narrow, tubular channel, into which the heater must fit, between the nozzle and the block.

Heaters such as those disclosed, for example, in DE 200 15 016 U1 or DE 20 2011 003 451 U1 were developed especially for applications in which such an increased space requirement cannot be met. The heating element is arranged between an inner metal jacket and an outer metal jacket in these heaters and the heater has a gap passing through it in the axial direction. Further, clamping elements are provided, which interact with the outer metal jacket such that their displacement in the axial direction causes a change in the width of the gap in the circumferential direction and the fixation on the body to be heated is achieved thereby.

A major problem of these heaters is the operation of the clamping elements, which must be carried out, with the heater pushed over, e.g., in many cases within a narrow, tubular channel, which is accessible from one side only. For example, it is barely possible to loosen the clamping element again. It is likewise problematic, in case of heaters whose length makes it necessary to arrange a plurality of clamping devices one after another in the axial direction in order to guarantee a sufficiently close contact between the heater and the object to be heated, to configure these such that they can be clamped individually.

SUMMARY OF THE INVENTION

An object of the present invention is to provide a clampable heater, in which better operability of the clamping element is guaranteed. This object is accomplished by a heater having the features of the present invention.

The electric heater according to the present invention has an axial opening for receiving a heated object, an electric heating element surrounding the axial opening at least in some sections, and an essentially cylindrical or essentially frustoconical clamping jacket surrounding the electric heating element at least in the radial direction for generating an adjustable force acting radially in the direction of an axis of the axial opening.

The geometry of such a heating cartridge can be described by resorting to terms known from the geometry of the cylinder or generalized cylinder and cylinder coordinates. The direction of the cylinder axis is predefined by the axis that defines the axial opening and will hereinafter be called axial direction. A force acts radially in the direction of this axis if it acts on a line connecting a point of the cylinder jacket and a point of the axis, which line is at right angles to this axis. A cylinder jacket surrounds the cylinder axis in the radial direction if a point of the jacket surface lies, at at least one point of the cylinder axis in any direction, i.e., between 0° and 360° when expressed in cylinder coordinates (where the origin of the polar angle is selectable), on the radius vector extending in this direction.

It is essential for the present invention that the clamping jacket is a multipart jacket, which is defined in the sense of the present invention such that there is, at least in the unclamped state, at least one area of the axis of the axial opening in which radius vectors extending at a polar angle belonging to a first range of polar angles lead to a first segment of the clamping jacket and radius vectors extending at a polar angle belonging to a second range of polar angles lead to a second segment of the clamping jacket, which segment is not formed integrally in one piece with the first segment of the clamping jacket, but may be connected to this, e.g., by a guide.

Further, the clamping jacket according to the present invention has at least one pressing segment for introducing the force acting radially in the direction of an axis of the axial opening as well as at least one clamping segment, with which the width of the gap between adjacent edges of pressing segments can be varied for adjusting the force acting radially in the direction of an axis of the axial opening by moving the clamping segment relative to the pressing segment. The pressing segment may be in direct contact with a surface of the heating element, for example, if a coiled tube cartridge is used as the heating element, but it may also pass on the force indirectly, e.g., via an outer jacket surrounding the entire heating element.

If there are more than one pressing segment, adjacent edges of pressing segments are always the mutually opposite edges of adjacent pressing segments, while if there is only one pressing segment, the edges of this segment are adjacent to one another.

According to a first, especially preferred variant of the present invention, there are at least two clamping segments, especially a front clamping segment and a rear clamping segment, with which the width of the gap between different sections of the same, mutually opposite edges of pressing segments can be varied to adjust the force acting radially in the direction of an axis of the axial opening. One of the clamping segments, especially the rear clamping segment, now has an actuating element, which extends in the direction of the end face of the other, especially rear, clamping segment. It becomes possible due to this measure to operate the front clamping segment from the direction of the end face of the front clamping segment, even though it is extensively covered by the front clamping segment. It should be noted that the clamping segment that has the actuating element is always considered to be the rear clamping segment.

In a variant of the present invention, which can be embodied as an alternative or in combination therewith, at least two pressing segments and at least one first clamping segment and a second clamping segment are present. The clamping segments and pressing segments are configured here such that in the case of the second clamping segment, a motion in the motion direction, in which the first clamping segment is moved to increase the force acting radially in the direction of an axis of the axial opening, leads to a reduction of the force acting radially in the direction of an axis of the axial opening. It becomes possible in this manner to loosen the electric heater clamped first on the component to be heated, for example, by using the first clamping segment, by actuating the second clamping segment, even in installation situations in which the electric heater or the clamping segments thereof are accessible from one side only.

Further, it is advantageous if the clamping segments have a different color, geometry (i.e., especially different width, length and/or thickness) or surface geometry (i.e., especially different front-side contours and/or surface structures). This makes it possible to identify the clamping segments in a simple manner even if only their end faces can be recognized because of the installation situation.

In addition, an adaptation to different requirements imposed on the acting forces can be achieved by changing these aspects of the geometry or surface geometry.

A preferred manner in which the variable distance between adjacent edges of pressing segments can be obtained for adjusting the force acting radially in the direction of an axis of the axial opening by moving the clamping segments relative to the pressing segment is that the clamping segment has guide elements, which mesh with different recesses provided in different, especially mutually adjacent pressing segments, the distance between the recesses changing in the direction of the relative motion between pressing elements and clamping segments. As an alternative, this principle of action may be reversed, so that two, especially mutually adjacent, pressing segments have guide elements, which mesh with different recesses provided in the same clamping segment, the distance between the recesses changing in the direction of the relative motion between pressing segments and clamping segments.

The guide elements may be configured, e.g., as pins, blocks or straps, which are connected to the pressing segment and the clamping segments, especially at the time of manufacture, in one piece (e.g., forming in one piece, molding in one piece or by punching out and bending or cutting out and bending of a strap), but the pins, blocks or straps may also be connected to the pressing segment or clamping segment by a welded, soldered or bonded connection.

The recesses may be prepared, e.g., by the milling, punching, laser cutting or water jet cutting of grooves in the pressing segment or clamping segment.

A shaping of the recesses, which is preferred because of its simplicity in the just described manner of embodying the possibility of providing a radial force variable due to relative motion between the clamping segment and the pressing segment, is in which the recesses with which different clamping segments mesh or the recesses are linear and extend at an angle relative to the axis of the axial opening. The variation of the radial force can now be brought about by a simple displacement of the clamping segments relative to the pressing segments in the axial direction.

It may be advantageous now if the variation of the radial force that is obtained due to a given motion of different clamping segments relative to the pressing segments is different in different clamping segments. This can be achieved through a correspondingly adapted shape of the recesses, for example, by the recesses for the clamping segments, which are axially displaced, extending at different angles relative to the axis of the axial opening.

As an alternative or in addition, the recesses with which different clamping segments mesh or the recesses of different clamping segments have different lengths. The applicable force can be adapted to the requirements of the application hereby as well.

In an advantageous variant of the present invention, the clamping elements can be secured against an unintended motion relative to the pressing elements by the recesses and/or the guide elements and/or contact surfaces between clamping segment and pressing segment having a surface with a great surface roughness or a ribbing. For example, a blocking can be achieved by an oxidized surface.

Provisions are made in another advantageous embodiment of the present invention for the clamping segments to be configured such that different forces are needed for moving different clamping segments.

Moreover, the electric heater may have a securing mechanism and/or a blocking for securing against unintended motion. Such a blocking may be brought about especially by the inner width of the recess being varied and decreasing in the clamping direction, as it happens, for example, in case of a conical recess, but also by contoured or oxidized surfaces.

According to another advantageous embodiment of the present invention, at least one clamping segment has a recess on the end face for receiving a tool.

A variant of this embodiment, in which an accidental operation of the incorrect clamping segment can be avoided with certainty, is characterized in that on different clamping segments, at least one clamping segment has at least one of at least two different recesses, on the end face, for receiving respective different tools.

If the electric heater has at least two mutually adjacent pressing segments, it is advantageous if the mutually adjacent pressing segments of the clamping jacket of the electric heater have a securing against displacement in relation to one another in the direction of the axis of the axial opening. Mutually adjacent pressing segments are defined here as pressing segments that have mutually opposite edges. In other words, a connection of two pressing segments via a clamping segment does not cause these two pressing segments not to be mutually adjacent any more. The securing may be achieved, for example, by a projection of one pressing segment meshing with a recess in the edge of the other pressing segment, which said edge faces that pressing segment.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1b is an exploded view of the electric heater from FIG. 1a;

FIG. 1c is a developed view of the clamping jacket of the electric heater from FIG. 1a before clamping the electric heater on a component to be heated;

FIG. 1d is a developed view of the clamping jacket of the electric heater from FIG. 1a while the electric heater is clamped onto a component to be heated;

FIG. 1e is a developed view of the clamping jacket of the electric heater from FIG. 1a during the detachment of the electric heater from the component to be heated;

FIG. 1f is an enlarged detail view of a mount of a clamping segment of the clamping jacket with guide element received therein;

FIG. 2a is a view of a second embodiment of an electric heater;

FIG. 2b is an exploded view of the electric heater from FIG. 2a;

FIG. 2c is a developed view of the clamping jacket of the electric heater from FIG. 2a;

FIG. 5a is a view of a fifth embodiment of an electric heater;

FIG. 5b is an exploded view of the electric heater from FIG. 5a;

FIG. 6a is a view of a sixth embodiment of an electric heater during the clamping process with a tool, while a clamping segment is being displaced with a hammer and a tool;

FIG. 6b is a first partial exploded view of an electric heater with tool from FIG. 6a;

FIG. 6c is a second partial exploded view of an electric heater with tool from FIG. 6a, viewed from the direction opposite the perspective view shown in FIG. 6b;

FIG. 6d is a cross-sectional view through a clamping segment with tool attached;

FIG. 7b is a developed view of the clamping jacket from FIG. 7a;

FIG. 9a is a view of a clamping jacket with a securing mechanism for a clamping segment;

FIG. 9b is a first detail view of the interaction of the securing mechanism and clamping segment in a clamping jacket from FIG. 9a;

FIG. 9c is a second detail view of the integration of the securing mechanism and the clamping segment in the clamping jacket from FIG. 9a;

FIG. 9d is a third detail view of the interaction of the securing mechanism and clamping segment in the clamping jacket from FIG. 9a;

FIG. 11a is a view of a clamping jacket with an alternative embodiment of pressing segments and clamping segments in a first position of the clamping segments;

FIG. 11b is a view of the clamping jacket from FIG. 11a in a second position of the clamping segments;

FIG. 11c is a cross sectional view through the overlapping areas of the pressing segments and a clamping segment along line A-A in FIG. 11a; and FIG. 11d is a three-dimensional, partially exploded view of the clamping jacket from FIG. 11a.

DESCRIPTION OF THE PREFERRED EMBODIMENTS

Figure 1A:
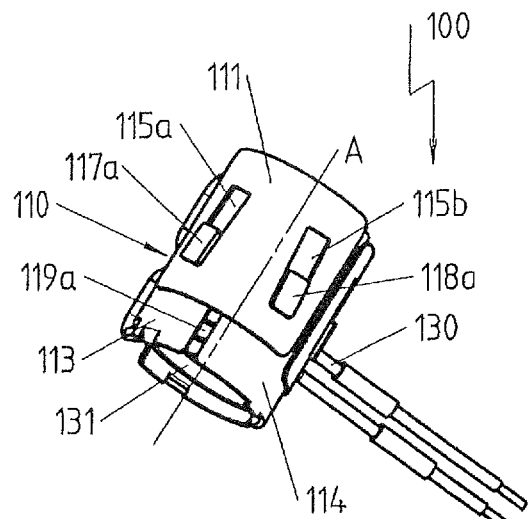
FIG. 1a is a view of a first embodiment of an electric heater.
Figure 1B:
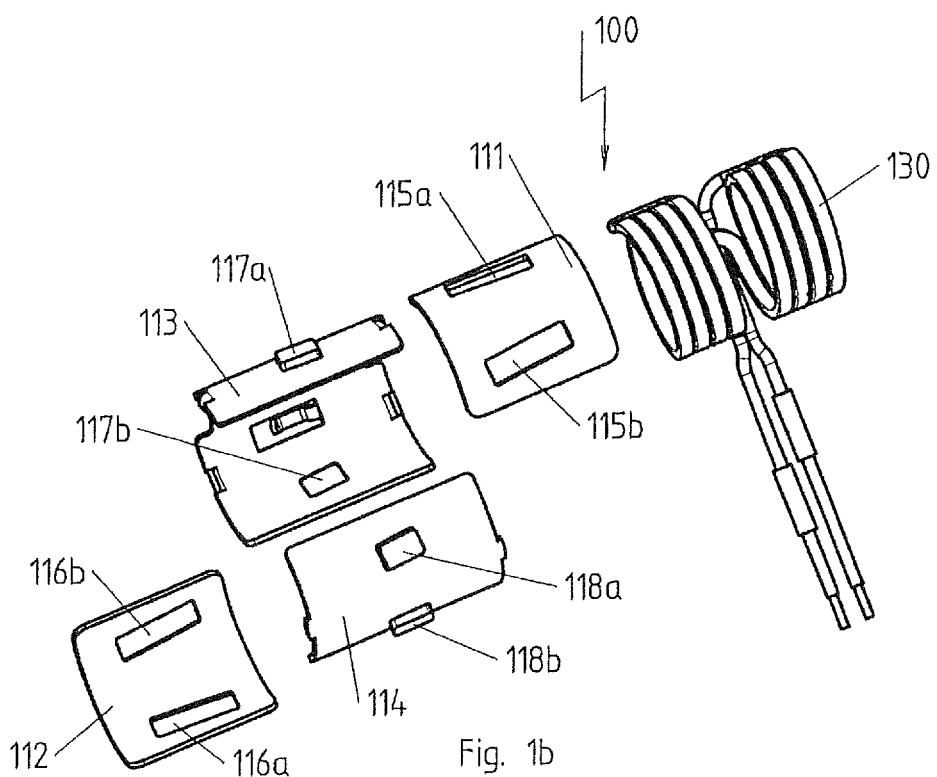

Referring to the drawings, FIGS. 1a and 1b show a first embodiment [of an] electric heater 100 with a clamping jacket 110, which is composed, as can be seen especially clearly in the exploded view shown in FIG. 1b, two clamping segments 111, 112 and two pressing segments 113, 114 and is thus a multipart clamping jacket.

A helically coiled electric heating element 130, with which the pressing segments 113, 114 are in contact, is arranged within the clamping jacket 110. Due to this shape, the heater 100 has an axial opening 131 that is cylindrical here with an axis A, the cylinder axis of the axial opening 131.

As can be seen especially clearly in FIG. 1b, two recesses 115a, 115b, 116a, 116b each, which extend linearly and at an angle to the axis A and which pass through the respective clamping segment 111, 112 in the radial direction, are present in the clamping segments 111, 112, while two guide elements 117a, 117b, 118a, 118b each are arranged at the pressing segments 113, 114. The guide elements 117a, 117b, 118a, 118b may be made integrally in one piece with the pressing segments 113, 114, but they may also be fastened to the pressing segments 113, 114 later, e.g., by welding, bonding or soldering.

The guide elements 117a, 118a, i.e., a guide element each of the two pressing segments 113, 114, mesh with the recesses 115a, 115b. The guide elements 117b, 118b, i.e., likewise a guide element each of the two pressing segments 113, 114, mesh with the recesses 116a, 116b of the clamping segment 112. The clamping segments 111, 112 thus connect the pressing segments to one another in order to form the clamping jacket 110 and can be displaced on this parallel to the axis A. Gaps 119a, 119b are present between the mutually opposite sides 113b, 114a and 114b, 113a of the pressing segments 113, 114.

The electric heater 100 correspondingly has, at least in the unclamped state of the clamping jacket 110, at least one area of the axis A of the axial opening 131 in which radius vectors extending at a polar angle belonging to a first range of polar angles lead to a first segment of the clamping jacket 110 and radius vectors extending at a polar angle belonging to a second range of polar angles lead to a second segment of the clamping jacket 110.

The width of the gaps 119a, 119b varies, due to the course of the recesses 115a, 115b and 116a, 116b, from the position of the respective clamping segment 111, 112 to the pressing segments 113, 114, as will be described more specifically on the basis of FIGS. 1c through 1e.

FIGS. 1c and 1e show the clamping jacket 110 in the developed state, which is obtained if the clamping jacket 110 is cut open at a selectable polar angle of 0° along the axis A and transforms it into a strip. The direction in which the electric heater 100 is pushed over the component to be heated is indicated here by arrows in order to preset a direction. It extends parallel to the axis A. As can easily be visualized, the same principle of action does, however, also apply when the direction of the arrows is reversed, so that no push-over direction, in which the electric heater 100 must be pushed over the object to be heated, is preset hereby for the electric heater 100.

As can be seen in FIGS. 1c through 1e, the recesses 115a, 115b of the clamping segment 111 extend at an angle α to the axis; more precisely, the distance between them increases in the push-over direction. The recesses 116a, 116b of the clamping segment 112 also extend at an angle α to the axis A, but they do so such that the distance between them increases in the push-over direction.

If the clamping element 111 is now displaced from the position shown in FIG. 1c into the position shown in FIGS. 1d and 1e, the guide elements 117a, 118a being guided in the recesses 115a, 115b are moved closer to one another and the width of the gap 119a decreases. The overall circumference of the clamping jacket 110 correspondingly decreases, which leads to an increase in the forces acting radially in the direction of the axis A. The electric heater 100 is consequently clamped onto the component to be heated.

If, by contrast, the clamping element 112 is displaced from the position shown in FIGS. 1c and 1d into the position shown in FIG. 1e, the guide elements 117b, 118b being guided in the recesses 116a, 118b are moved farther apart from one another and the width of the gap 119b increases. The overall circumference of the clamping jacket 110 correspondingly increases, which leads to a reduction of the forces acting radially in the direction of the axis A. The electric heater 100 is consequently detached from the component to be heated.

As can be seen in the detail view shown in FIG. 1f, fixation of a guide element 124 in a recess 125 may optionally be achieved by an incoming chamfer 123, especially if this is configured such that the inner width of the recess 115a, 115b decreases in the clamping direction.

FIGS. 2a through 2c show an electric heater 200 in another embodiment. Unless described otherwise below, the reference numbers of the components of this embodiment are obtained by adding 100 to the reference numbers of the corresponding components of the electric heater 100.

An electric heating element 230 is surrounded by a multipart clamping jacket 210 comprising two clamping segments 211, 212 and two pressing segments 213, 214 in the electric heater 200 as well, the pressing segments 213, 214 being in contact with the electric heating element 230.

The difference between this embodiment and the embodiment according to FIGS. 1a-1f is that the electric heater 200 is longer, so that the clamping segments 211, 212 have four recesses 215a-d, 216a-d each and the pressing segments 213, 214 have four guide elements 217a-d, 218a-d each, which are guided in one of the respective corresponding recesses 215a-d, 216a-d. The respective course of the pairs of recesses 215a and 215b, 215c and 215d corresponds to that of the pair of recesses 115a and 115b and to the respective course of the pairs of recesses 115a and 115b, and the respective course of the pairs of recesses 216a and 216b, 216c and 216d corresponds to that of the pair of recesses 116a and 116b. The same principle of action also applies correspondingly during the displacement of the clamping segments 211, 212.

It can be achieved in this way that the forces acting radially in the direction of the axis of the axial opening are homogeneous over the length of the electric heater 200.

Figure 3:
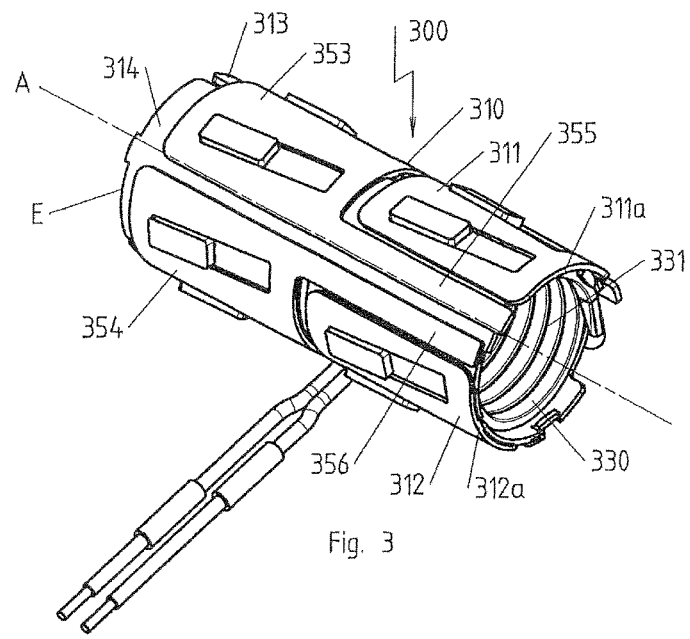
FIG. 3 is a view of a third embodiment of an electric heater.
Figure 4:
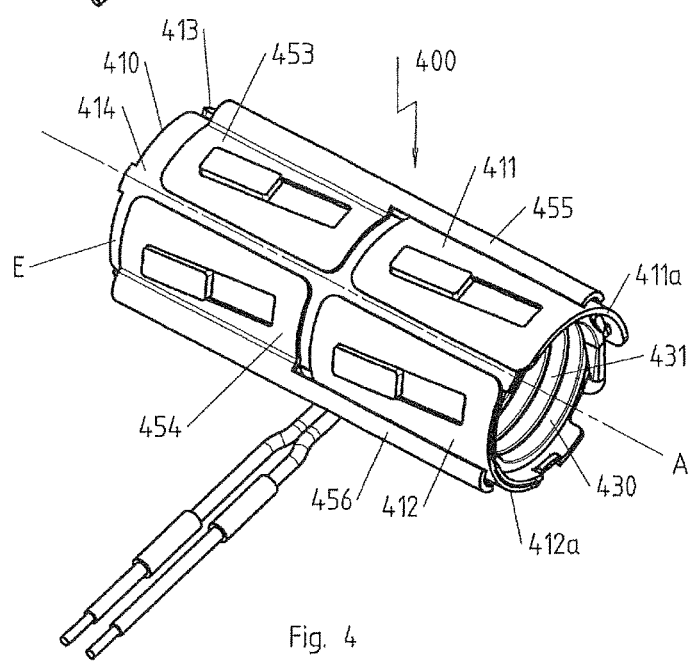
FIG. 4 is a view of a fourth embodiment of an electric heater.

The respective electric heaters 300 and 400 shown in FIGS. 3 and 4 perfect the electric heater 200 such that different radial forces can be adjusted on different sections of the electric heater 300, 400. Unless described otherwise below, the reference numbers of the components of the electric heater 300 are obtained by adding 100 to the reference numbers of the corresponding components of the electric heater 200 and, in the case of the electric heater 300, by adding 200 to the reference numbers of the corresponding components of the electric heater 200.

The difference from the electric heater 200 is that in addition to the respective pressing segments 313, 314 and 413, 414, the respective clamping jackets 310 and 410 have two additional clamping segments 353, 354 and 453, 454 each, which are located, when viewed in the axial direction, closer to the end E of the respective electric heater 300 and 400, with which end these are pushed over the object to be heated. To make a motion of the clamping segments 353, 354 and 453, 454 possible, these have respective actuating elements 355, 356 and 455, 456, which extend in the direction of the end faces 311a, 312a and 411a, 412a of the respective clamping segments 311, 312 and 411, 412. The difference between the electric heater 300 and the electric heater 400 is that the actuating elements 355, 356 extend next to the clamping segments 311, 312, while the actuating elements 455, 456 extend over the clamping segments 411, 412.

FIGS. 5a and 5b show another electric heater 500 with clamping jacket 510 and with heating element 530, which has largely the same configuration as the electric heater 100. This applies especially to the configuration and the mode of action of the clamping jacket 510. Unless described otherwise below, the reference numbers of the components of these embodiments are obtained by adding 100 to the reference numbers of the corresponding components of the electric heater 100.

The difference between the electric heater 500 and the electric heater 100 is that the electric heating element 530 describing a ring segment in a meandering manner is received in the electric heater 500 in a metal housing 550 with an inner jacket 551 and with an outer jacket 552, and a recess 553 passes through said metal housing. To guarantee good heat conduction, the electric heating element 530 is embedded in a material having good thermal conductivity, which is not shown, however, in the figure. The metal housing is closed with ring segment-like end plates 554, 555 each on the front side and on the end side.

The radial force that can be generated by the clamping jacket 510 is not correspondingly transmitted here directly to the electric heating element 530 through the pressing segments 513, 514, but to the outer jacket 552 of the metal housing 550. Due to the recess 553, the change brought about by a change in the width of the gaps 519a, 519b in the circumference of the clamping jacket 510 and the change in the acting radial forces, which is associated herewith, is converted directly into a change in the circumference of the metal housing 550 in the electric heater 500, which leads to an especially effective clamping on the object to be heated.

FIGS. 6a through 6d pertain to an electric hater 600 in an embodiment that is closely related to the electric heater 100. Unless described otherwise below, the reference numbers of the components of this embodiment are obtained by adding 500 to the reference numbers of the corresponding components of the electric heater 100.

Figures 6A, 6B, 6C, 6D:
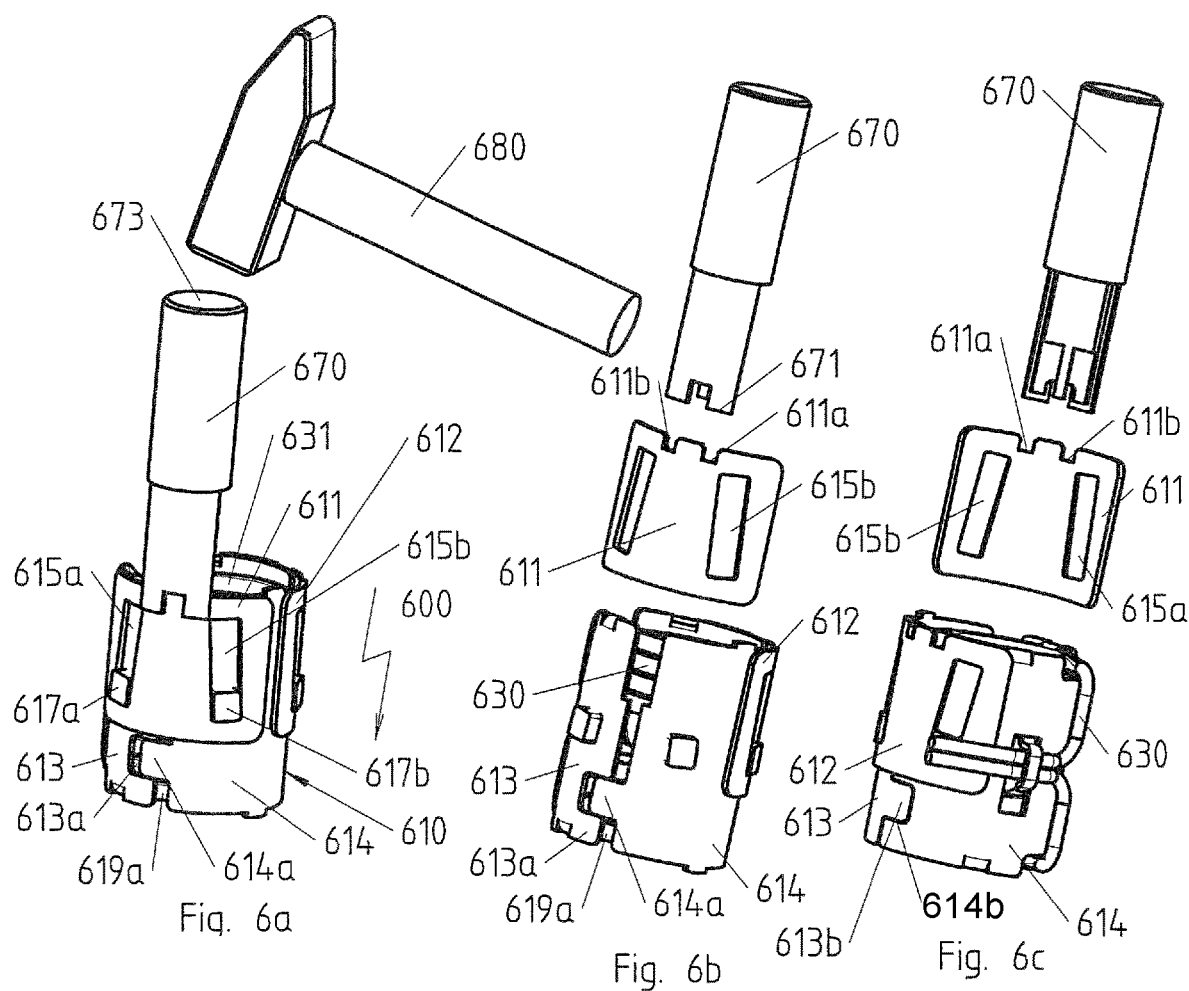

As can be seen especially clearly in the views according to FIGS. 6b and 6c, the electric heater 600 differs from the electric heater 100 in two aspects:

Firstly, the mutually adjacent pressing segments 613, 614 of the clamping jacket 610 of the electric heater 600 have a securing against displacement in relation to one another in the direction of the axis of the axial opening. This securing is obtained by the pressing segment 613 having a recess 613a, with which a projection 614a of the pressing segment 614 meshes in a positive-locking manner, at an edge located opposite the pressing segment 614. The projection 614a should project farther than the maximum width of the gap 619, and the recess 613a should be so deep that it can fully receive the projection 614a at a minimum width of the gap 619. It is especially advantageous in this connection if a recess 613a, 614b is provided at one edge of the two edges located opposite the other pressing segments and a projection 614a, 613b is provided at the other edge of the two edges located opposite other pressing segments, because the pressing segments 613, 614 can thus be embodied by identically configured components.

Secondly, the clamping segment 611 has, on the front side, i.e., on the side that is located opposite the push-over direction onto the object to be heated, two recesses 611a, 611b for receiving projections 671a, 671b of a tool tip 671 of a tool 670, which tool tip fits same. As can be seen especially when viewing FIGS. 6c and 6d together, the tool tip 671 is curved, and the radius of curvature is adapted to the radius of curvature of the clamping element 611. The projections 671a, 671b form the respective stem of two essentially T-shaped structures, whose T bars 671c, 671d extend radially over the recesses 611a, 611b in the radial direction from the outside and thereby prevent the tool 670 from slipping off inwardly. In addition, the tool tip 671 also has a web 671e for extending behind the clamping element on the inner side thereof, which web 671e also prevents the tool 670 from slipping off outwardly.

As is shown in FIG. 6a, the clamping element 611 can thus be operated by the tool 670 being attached and struck with a hammer 680 at the end 673 located opposite the tool tip 671.

Figure 7A:
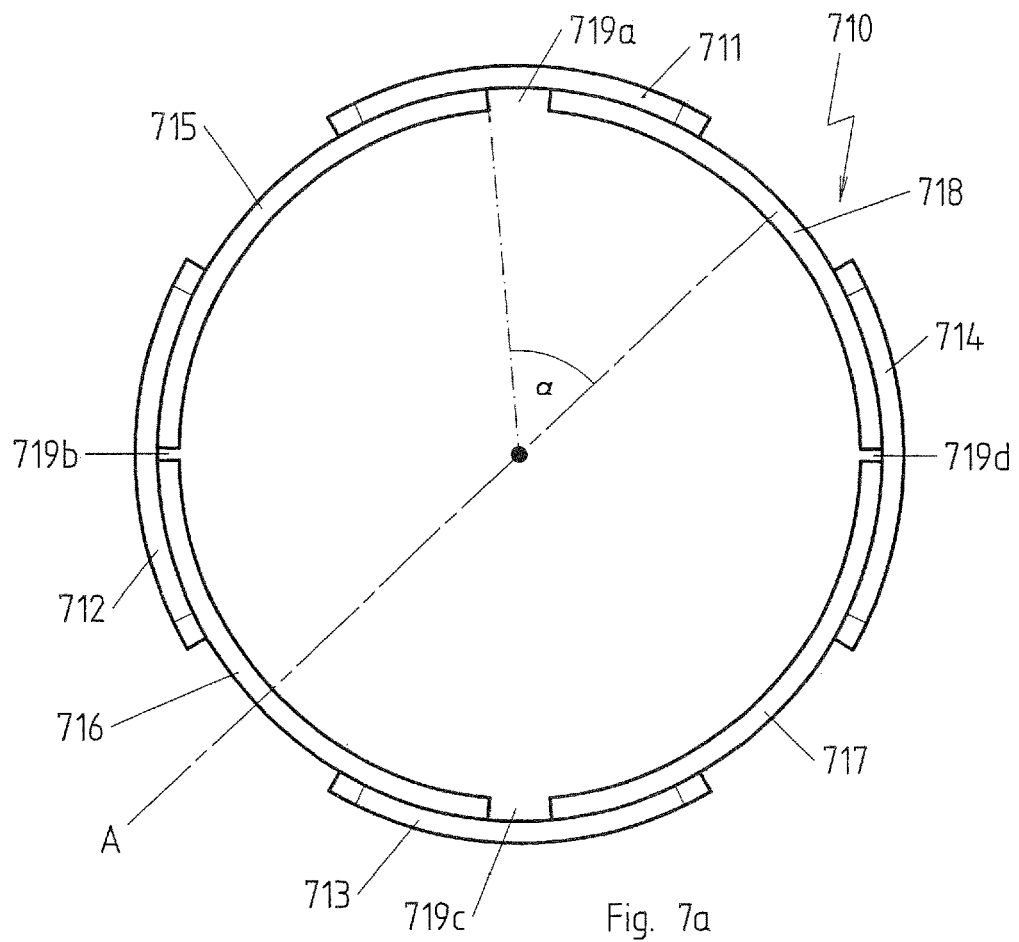
FIG. 7a is a cross-sectional view through a clamping jacket with four clamping segments and four pressing segments.

FIG. 7a shows a cross-sectional view through a clamping jacket 710 with four clamping segments 711-714, which have recesses 721a-724a, 721b-724b and four pressing segments 715-718 separated from one another by gaps 719a-d, with guide elements 725a-728a, 725b-728b, cut in a plane extending at right angles to the axis A of the axial opening.

Figure 7B:
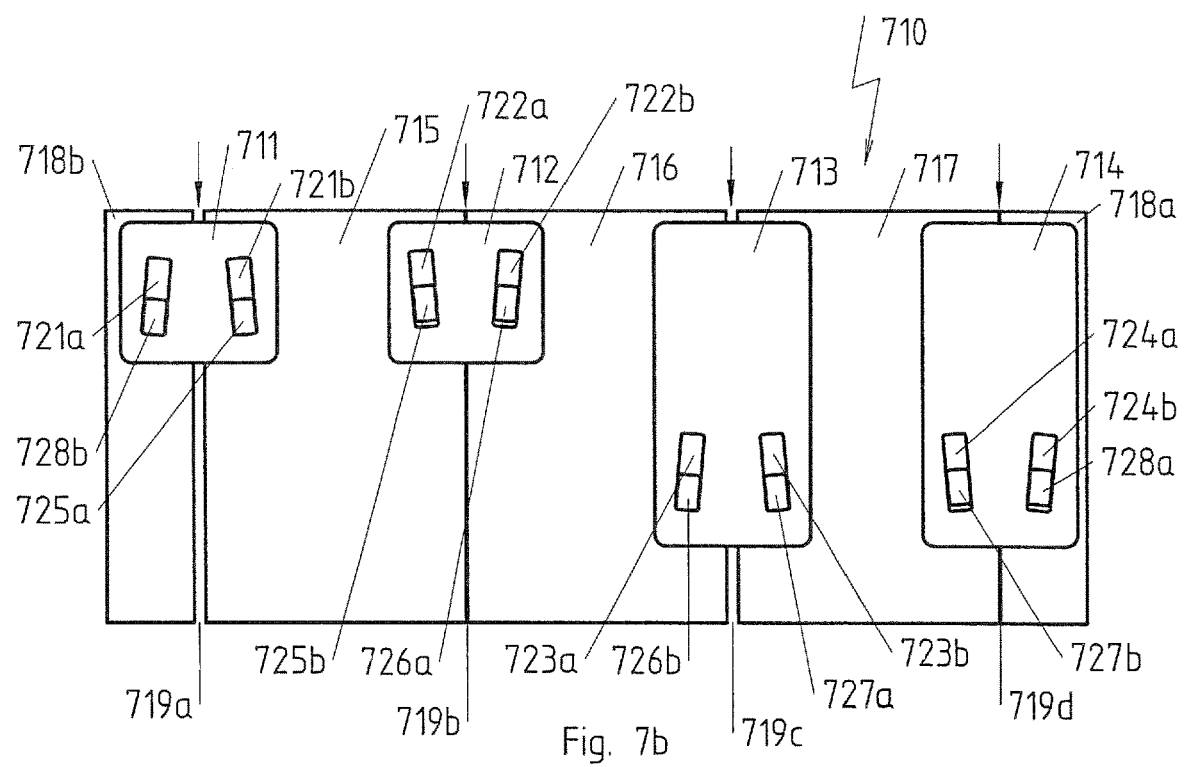

Further, FIG. 7 schematically shows an exemplary polar angle φ, which describes the polar angle that is obtained for the position of the beginning of the pressing segment 715 when the zero point of the polar angle is defined such that it describes the left-hand end of the developed view according to FIG. 7b.

FIG. 7b shows the clamping jacket from FIG. 7a in a developed view, which shows, in particular, that by providing a clamping jacket 710 with more than two pressing segments 715-718, homogeneous clamping of an electric heater is possible without having to arrange a plurality of clamping segments 711-714 one after another.

Other possible embodiments of the motion and of a course of the recesses adapted to the respective motion are also shown as examples on the basis of FIGS. 8a through 8f, showing for this again the respective clamping jackets 810, 820, 830 in a developed view in these figures. The clamping jackets 810, 820, 830 have two respective clamping segments 811, 812, 821, 822, 831, 832 with recesses 815a, 815b, 816a, 816b, 825a, 825b, 826a, 826b, 835a, 835b, 836a, 836b and two pressing segments 813, 814a, 814b, 823, 824a, 824b, 833, 834a, 834b with guide elements 817a, 817b, 818a, 818b, 827a, 827b, 828a, 828b, 837a, 837b, 838a, 838b, where, as was already explained above, the sections 814a, 814b, 824a, 824b, 834a, 834b shown at the edge in the developed view always belong to the same pressing segment. Gaps 819a, 819b, 829a, 829b, 839a, 839b, whose width varies, because of the course of the recesses 815a, 815b, 816a, 816b, 825a, 825b, 826a, 826b, 835a, 835b, 836a, 836b, depending on the position of the clamping segments 811, 812, 821, 822, 831, 832 relative to the pressing segments 813, 814a, 814b, 823, 824a, 824b, 833, 834a, 834b, are present between the edges of adjacent pressing segments 813, 814a, 814b, 823, 824a, 824b, 833, 834a, 834b.

Figure 8A:
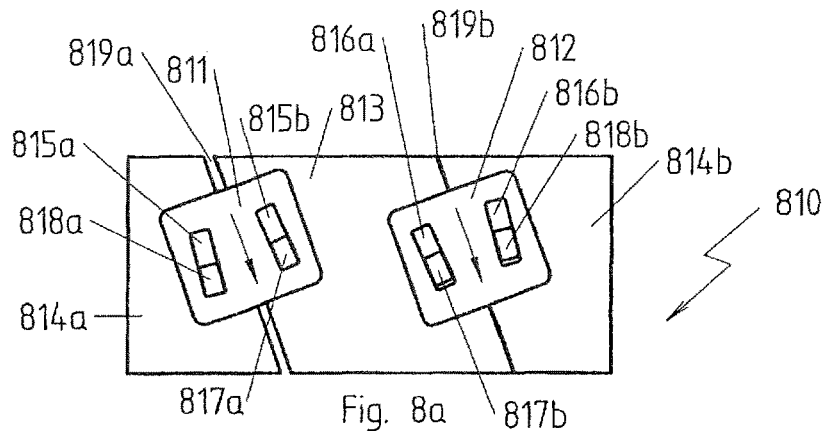
FIG. 8a is a view of a first alternative embodiment of the clamping segments and the guiding thereof on the pressing segments in a first position.
Figure 8B:
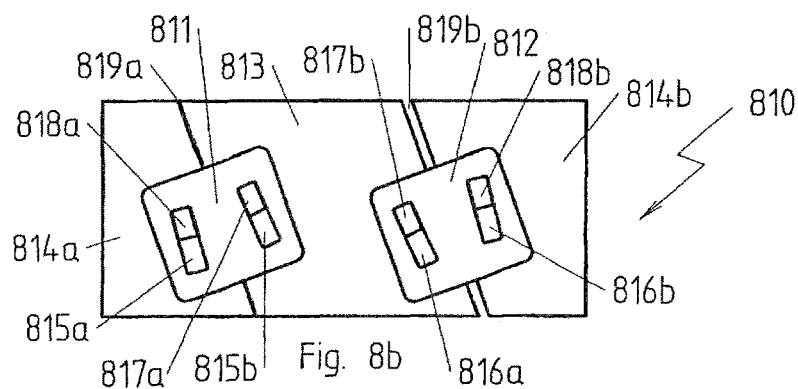
FIG. 8b is a view of the embodiment of the clamping segments and the guiding thereof on the pressing segments from FIG. 8a in a second position.
Figure 8C:
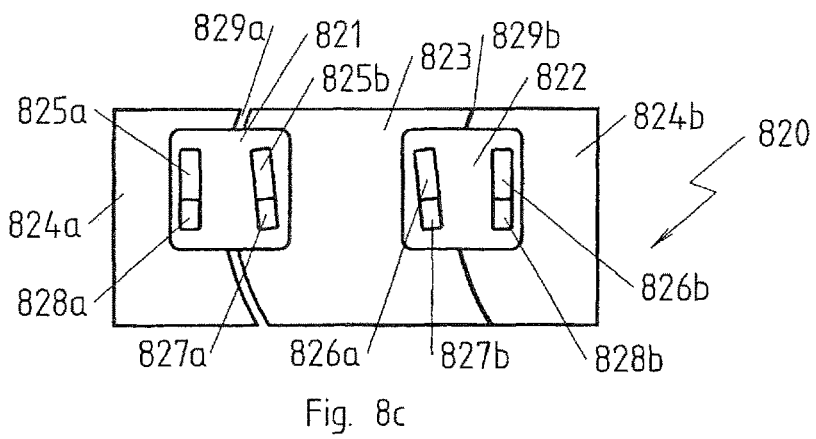
FIG. 8c is a view of a second alternative embodiment of the clamping segments and the guiding thereof on the pressing segments in a first position.
Figure 8D:
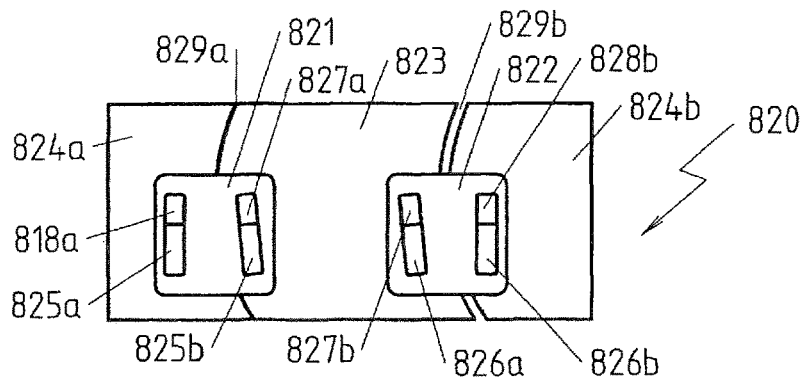
FIG. 8d is a view of the embodiment of the clamping segments and the guiding thereof on the pressing segments from FIG. 8c in a second position.
Figure 8E:
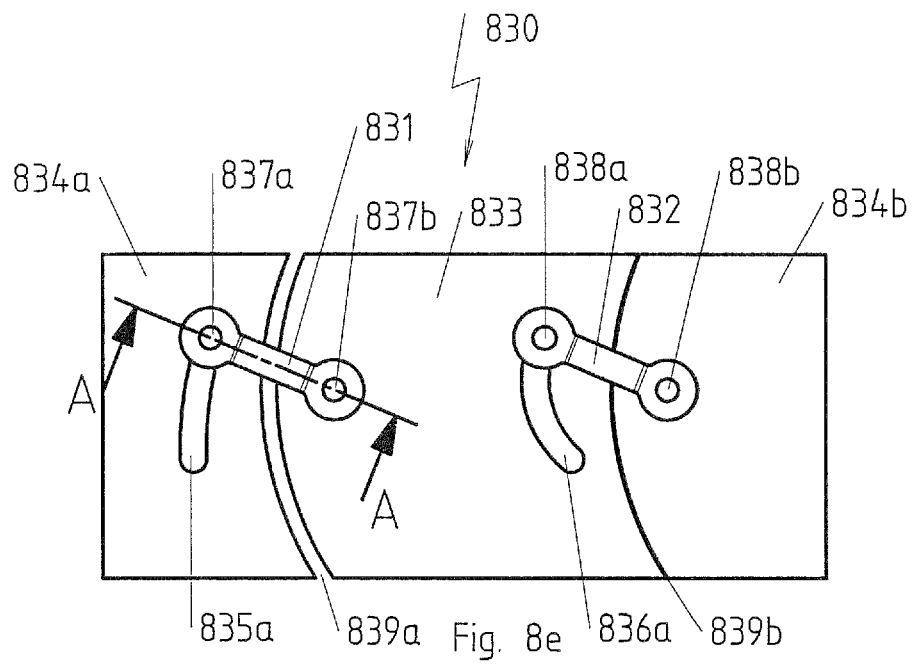
FIG. 8e is a view of a third alternative embodiment of the clamping segments and the guiding thereof on the pressing segments in a first position.
Figure 8F:
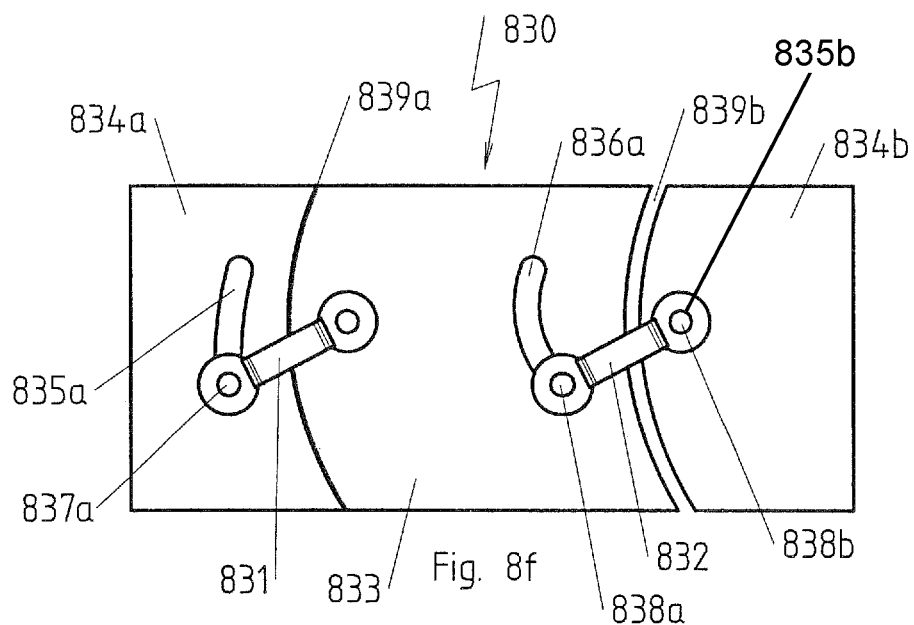
FIG. 8f is a view of the embodiment of the clamping segments and the guiding thereof on the pressing segments from FIG. 8e in a second position.

The directions of motion in which the clamping segments 811, 812, 821, 822, 831, 832 are moved in order to be transferred from the position shown in FIGS. 8a, 8c, 8e into the position shown in FIGS. 8b, 8d and 8f are indicated by arrows. If the width of a gap 819a, 819b, 829a, 829b, 839a, 839b is increased during this motion, this leads to a reduction of the radial forces and the heater is detached; if it is reduced, the radial forces increase and the heater is clamped.

In the embodiment according to FIGS. 8a and 8b, the direction of motion of the clamping segments 811, 812 is linear, but it does not extend parallel to the axis of the axial opening. When the clamping segment 811 is displaced in this direction, the radial forces increase, and they decrease during displacement of the clamping segment 812.

In the embodiment according to FIGS. 8c and 8d, the edge of the clamping segments 821, 822 extends in the form of a curved line and the recesses 825a, 826b of the clamping segments 821, 822 extend parallel to the axis of the axial opening. The radial forces increase during displacement of the clamping segment 821 in this direction, and they decrease during displacement of the clamping segment 822.

Figure 8G:
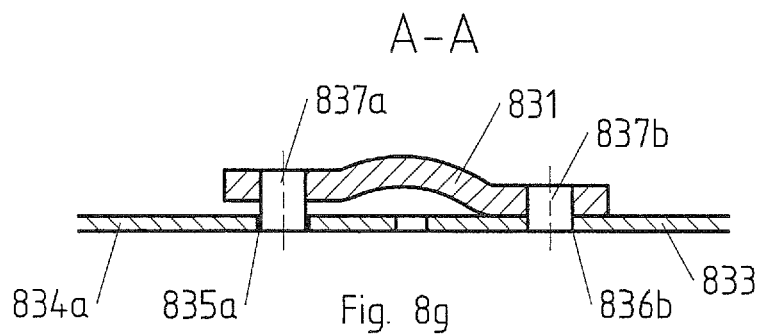
FIG. 8g is a cross sectional view through a clamping segment from FIG. 8e.

As can be seen especially clearly from the corresponding cross-sectional view based on the example of the mounting of the clamping segment 831 according to FIG. 8g, the clamping segments 831, 832 have the guide elements 837a, 837b, 838a, 838b, which have a pin-shaped configuration here. The motion of the clamping segments 831, 832 is a rotary motion about an axis of rotation, which is defined by the pin-like guide elements 837b, 838b being held in the recesses 835b, 836b of the pressing segments 833, 834. As a consequence of the shape of the recess 835a, in which the guide element 837a is guided, the radial forces increase during the corresponding rotation of the clamping segment 831 in this direction, because the gap 839*a* is reduced, as can be seen in FIG. 8*f*. The radial forces decrease during the rotation of the clamping segment 832 in the corresponding direction as a consequence of the shape of the recess 836*a*, in which the guide element 838*a* is guided, because the gap 839*b* is reduced.

Figures 9A, 9B, 9C, 9D:
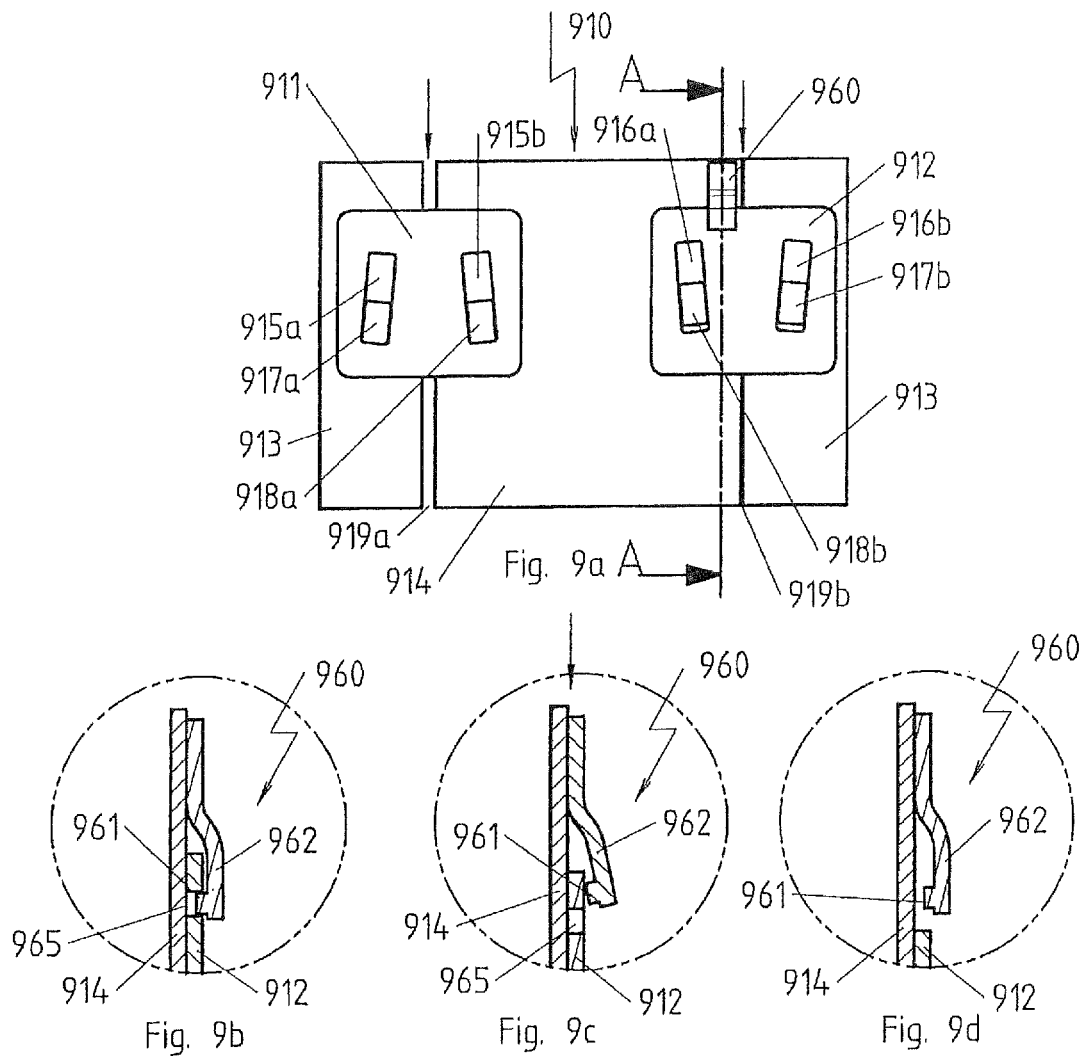

FIG. 9*a* shows an alternative embodiment of a clamping jacket 910 with clamping segments 911, 912 and pressing elements 913, 914, wherein the clamping jacket 910 is shown in a developed view. As can easily be seen from a comparison of FIGS. 1*c* and 9*a*, the clamping jacket 910 has a configuration largely identical to that of clamping jacket 110, and the reference numbers are therefore obtained from the reference numbers used in FIG. 1*c* by adding 800, unless specified otherwise below.

The clamping jacket 910 differs from the clamping jacket 110 in that the clamping segment 912 has a securing mechanism 960, which is fastened to the pressing segment 914, and meshes with a depression or opening in the clamping segment 912 by means of a locking projection 961, which is arranged at an arm 962 extending over a section of the clamping segment 912, as this is shown in FIG. 9*b*. As can be seen in FIGS. 9*c* and 9*d*, this securing mechanism is released to move the clamping segment 912.

Figure 10:
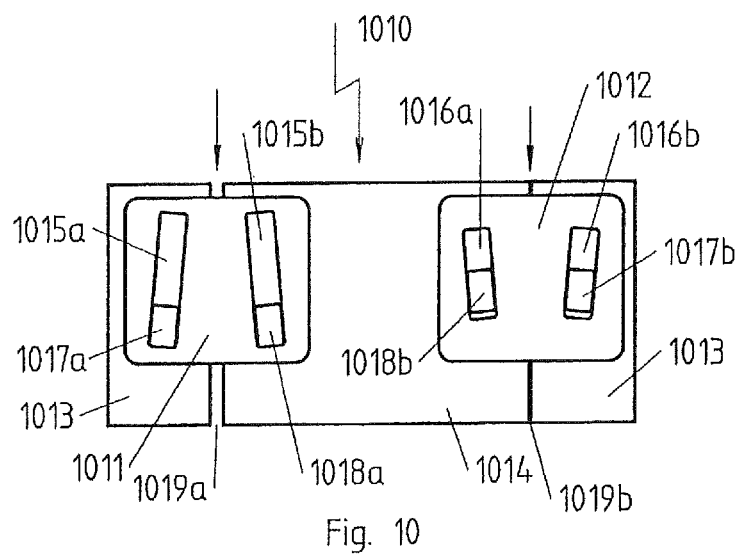
FIG. 10 is a view of a clamping jacket, in which the variation of the radial force for the clamping segments, which is achieved by the motion of the clamping segments, is different.

FIG. 10 shows, likewise in a developed view, another, alternative embodiment for a clamping jacket 1010, which likewise has, as can easily be seen from a comparison of FIGS. 1*c* and 10, a configuration largely identical to that of the clamping jacket 110, and the reference numbers are therefore obtained from the reference numbers used in FIG. 1*c* by adding 900, unless specified otherwise below.

The clamping jacket 1010 differs from the clamping jacket 110 in that the recesses 1015*a*, 1015*b* of the clamping segment 1011 and the recesses 1016*a*, 1016*b* of the clamping segment 1012 have different lengths, and the rate at which their distance from one another changes, which is correlated with the angle to the axis at which the respective recesses 1015*a*, 1015*b*, 1016*a*, 1016*b* extend, is different. It is possible due to these measures to adapt the variation of the radial force, which is brought about by the motion of the clamping segment 1011, 1012, to a curve of a desired shape. There is, of course, no limitation, in principle, to linearly extending recesses 1015*a*, 1015*b*, 1016*a*, 1016*b*.

Again in a developed view, while the corresponding three-dimensional view is shown as FIG. 11*d*, FIG. 11*a* shows a clamping jacket 1110 with an alternative embodiment of pressing segments 1113, 1114 and clamping segments 1111, 1112, wherein contours of components hidden by other components are indicated by broken lines. The pressing segments 1113, 1114 have a welded-on section 1113*a*, 1114*a* each, which extends over a section of the respective other pressing segment 1114, 1113 and in which a recess 1113*b*, 1114*b* passing through the respective section 1113*a* and 1114*b* is prepared.

A respective recess 1114*c* and 1113*c*, which extends at an angle to the respective recess 1113*b* and 1114*b* and has an area in which it overlaps the respective recess 1113*b* and 1114*b* at any width of the gaps 1119*a*, 1119*b* existing between the adjacent edges of the pressing segments, is prepared in the respective pressing segment 1114 and 1113 over which the respective section 1113*a* and 1114*a* extends.

As can be seen especially clearly in the view according to FIG. 11*c*, the respective clamping segments 1111 and 1112 are guided in the respective recesses 1113*c* and 1114*c* and also pass through the respective recesses 1114*b* and 1113*c* in the area in which these overlap the respective recesses 1114*b* and 1113*c*, doing so preferably to the extent that they project over the respective sections 1114*a* and 1113*a* in the radial direction. This leads to a restricted guidance, which correlates the width of the respective gaps 1119*a* and 1119*b* with the position of the respective clamping segments 1111 and 1112, so that the width of the respective gaps 1119*a* and 1119*b* can be controlled by moving the respective clamping segments 1111 and 1112.

In order for the motion of one clamping segment 1111 in one direction to lead to a decreasing gap 1119*a*, the recess 1113*c* must extend from left to right when viewed in this direction. In order for the motion of the other clamping segment 1112 in the same direction to lead to an increasing gap 1119*b*, it must be from right to left when viewed in this direction.

FIG. 11*b* illustrates the clamping jacket 1110 from FIG. 11*a* in the position into which it is transferred by the displacement of both clamping segments 1111, 1112.

While specific embodiments of the invention have been shown and described in detail to illustrate the application of the principles of the invention, it will be understood that the invention may be embodied otherwise without departing from such principles.

APPENDIX:

LIST OF REFERENCE NUMBERS

100, 200, 300, 400, 500, 600 Electric heater 110, 210, 310, 410, 510, 610, 710, 810, 910, 1010, 1110 Clamping jacket 111, 112, 211, 212, 311, 312, 411, 412, 511, 512, 611, 612, 711, 712, 713, 714, 811, 812, 821, 822, 831, 832, 911, 912, 1011, 1012, 1111, 1112 Clamping segment 113, 114, 213, 214, 313, 314, 413, 414, 513, 514, 613, 614, 715, 716, 717, 718, 813, 814, 823, 824, 833, 834, 913, 914, 1013, 1014, 1113, 1114 Pressing segment 115*a*, 115*b*, 116*a*, 116*b*, 215*a*, 215*b*, 215*c*, 215*d*, 216*a*, 216*b*, 216*c*, 216*d*, 515*a*, 515*b*, 516*a*, 516*b*, 615*a*, 615*b*, 616*a*, 616*b*, 721*a*, 721*b*, 722*a*, 722*b*, 723*a*, 723*b*, 724*a*, 724*b*, 815*a*, 815*b*, 816*a*, 816*b*, 825*a*, 825*b*, 826*a*, 826*b*, 835*a*, 835*b*, 836*a*, 836*b*, 915*a*, 915*b*, 916*a*, 916*b*, 1015*a*, 1015*b*, 1016*a*, 1016*b* Recess 117*a*, 117*b*, 118*a*, 118*b*, 217*a*, 217*b*, 217*c*, 217*d*, 218*a*, 218*b*, 218*c*, 218*d*, 517*a*, 517*b*, 518*a*, 518*b*, 617*a*, 617*b*, 618*a*, 618*b*, 725*a*, 725*b*, 726*a*, 726*b*, 727*a*, 727*b*, 728*a*, 728*b*, 817*a*, 817*b*, 818*a*, 818*b*, 827*a*, 827*b*, 826*a*, 828*b*, 837*a*, 837*b*, 838*a*, 838*b*, 917*a*, 917*b*, 918*a*, 918*b*, 1017*a*, 1017*b*, 1018*a*, 1018*b* Guide element 119*a*, 119*b*, 219*a*, 219*b*, 319*a*, 319*b*, 419*a*, 419*b*, 519*a*, 519*b*, 619*a*, 619*b*, 719*a*, 719*b*, 719*c*, 719*d*, 819*a*, 819*b*, 829*a*, 829*b*, 839*a*, 839*b*, 919*a*, 919*b*, 1019*a*, 1019*b*, 1119*a*, 1119*b* Gap 123 Chamfer 124 Guide element 125 Recess 130, 230, 330, 430, 530, 630 Electric heating element 131, 231, 331, 431, 531, 631 Axial opening 311*a*, 312*a*, 411*a*, 412*a* End face 353, 354, 453, 454 Clamping segment 550 Metal housing 551 Inner jacket 552 Outer jacket 553 Recess 611*a*, 611*b* Recess 613*a*, 614*b* Recess 614*a*, 613*b* Projection 670 Tool 671*a*, 671*b* Projection 671*c*, 671*d* T bar 671*e* Web 673 End 960 Securing mechanism 961 Locking projection 962 Arm 1113*a*, 1114*a* Section 1113*b*, 1113*c*, 1114*b*, 1114*c* Recess A Axis φ Polar angle

What is claimed is:

1. An electric heater, comprising:
   an axial opening for receiving an object to be heated;
   an electric heating element at least partially surrounding said axial opening; and
   a cylindrical or frustoconical clamping jacket surrounding said electric heating element at least in a radial direction for generating an adjustable force acting radially in a direction of an axis of said axial opening, said clamping jacket comprising a multipart clamping jacket and at least one pressing segment for introducing said force acting radially in said direction of said axis of said axial opening, said clamping jacket further comprising at least one clamping segment, wherein a width of a gap between adjacent edges of one or more pressing segments is varied for adjusting said force acting radially in said direction of said axis of said axial opening by moving said clamping segment relative to said at least one pressing segment, said clamping jacket further comprising another clamping segment to provide at least two clamping segments, with which said width of said gap between different sections of mutually opposite edges of pressing elements is variable for adjusting said force acting radially in said direction of said axis of said axial opening, wherein one of said at least two clamping segments has an actuating element, which extends in a direction of an end face of said another clamping segment.

2. An electric heater in accordance with claim 1, wherein said clamping jacket further comprises another pressing segment to provide at least two pressing segments and said two clamping segments comprise at least one first clamping segment and at least one second clamping segment, which are configured such that with respect to said second clamping segment, a motion in a motion direction in which said first clamping segment is moved to increase said force acting radially in said direction of said axis of said axial opening leads to a reduction of said force acting radially in the direction of said axis of the axial opening.

3. An electric heater in accordance with claim 1, wherein said at least two clamping segments have different colors, geometries or surface geometries.

4. An electric heater in accordance with claim 1, wherein said clamping segment has guide elements, which mesh with recesses provided in different pressing segments, wherein a distance between said recesses changes in a direction in which a relative motion takes place between said pressing segments and clamping segments, or each of two pressing segments has guide elements, which mesh with different recesses provided in a respective clamping segment, wherein a distance between said recesses changes in a direction in which a relative motion takes place between said pressing segments and said clamping segments.

5. An electric heater in accordance with claim 4, wherein said recesses, with which different clamping segments mesh, or said recesses of said different clamping segments extend at different angles relative to said axis of said axial opening.

6. An electric heater in accordance with claim 5, wherein said recesses mesh with said different clamping segments or said recesses of said different clamping segments have different lengths.

7. An electric heater in accordance with claim 5, wherein different forces are required to move different clamping segments relative to said pressing segments.

8. An electric heater in accordance with claim 1, wherein at least one of said two clamping segments has a securing mechanism or a blocking for securing against unintended displacement.

9. An electric heater in accordance with claim 1, wherein one of at least two different recesses or one of at least two different groups of recesses is arranged at different clamping segments on a front side.

10. An electric heater in accordance with claim 1, wherein said clamping jacket comprises another pressing segment to provide at least two pressing segments, said at least two pressing segments being mutually adjacent pressing segments and said mutually adjacent pressing segments of said clamping jacket of the electric heater having a securing mechanism against displacement in relation to one another in said direction of said axis of said axial opening.

11. An electric heater, comprising:
an axial opening for receiving an object to be heated;
an electric heating element at least partially surrounding said axial opening; and
a cylindrical or frustoconical clamping jacket surrounding said electric heating element at least in a radial direction for generating an adjustable force acting radially in a direction of an axis of said axial opening, said clamping jacket comprising a multipart clamping jacket and at least one pressing segment for introducing said force acting radially in said direction of said axis of said axial opening, said clamping jacket further comprising at least one clamping segment, wherein a width of a gap between adjacent edges of one or more pressing segments is varied for adjusting said force acting radially in said direction of said axis of said axial opening by moving said clamping segment relative to said at least one pressing segment, said clamping segment having guide elements, which mesh with recesses provided in different pressing segments, wherein a distance between said recesses changes in a direction in which a relative motion takes place between said pressing segments and clamping segments, or each of two pressing segments has guide elements, which mesh with different recesses provided in a respective clamping segment, wherein a distance between said recesses changes in a direction in which a relative motion takes place between said pressing segments and said clamping segments.

12. An electric heater in accordance with claim 11, wherein said two clamping segments comprise at least one first clamping segment and at least one second clamping segment, which are configured such that with respect to said second clamping segment, a motion in a motion direction in which said first clamping segment is moved to increase said force acting radially in said direction of said axis of said axial opening leads to a reduction of said force acting radially in the direction of said axis of the axial opening.

13. An electric heater in accordance with claim 11, wherein said at least two clamping segments have different colors, geometries or surface geometries.

14. An electric heater in accordance with claim 11, wherein at least one of said two clamping segments has a securing mechanism or a blocking for securing against unintended displacement.

15. An electric heater in accordance with claim 11, wherein one of at least two different recesses or one of at least two different groups of recesses is arranged at different clamping segments on a front side.

16. An electric heater, comprising:
an axial opening for receiving an object to be heated;
an electric heating element at least partially surrounding said axial opening; and
a cylindrical or frustoconical clamping jacket surrounding said electric heating element at least in a radial direction for generating an adjustable force acting radially in a direction of an axis of said axial opening, said clamping jacket comprising a multipart clamping jacket and at least one pressing segment for introducing said force acting radially in said direction of said axis of said axial opening, said clamping jacket further comprising at least one clamping segment, wherein a width of a gap between adjacent edges of one or more pressing segments is varied for adjusting said force acting radially in said direction of said axis of said axial opening by moving said clamping segment relative to said at least one pressing segment, said clamping jacket comprising another pressing segment to provide at least two pressing segments, said at least two pressing segments being mutually adjacent pressing segments and said mutually adjacent pressing segments of said clamping jacket of the electric heater having a securing mechanism against displacement in relation to one another in said direction of said axis of said axial opening.

17. An electric heater in accordance with claim 16, wherein said clamping jacket further comprises another pressing segment to provide at least two pressing segments and said two clamping segments comprise at least one first clamping segment and at least one second clamping segment, which are configured such that with respect to said second clamping segment, a motion in a motion direction in which said first clamping segment is moved to increase said force acting radially in said direction of said axis of said axial opening leads to a reduction of said force acting radially in the direction of said axis of the axial opening.

18. An electric heater in accordance with claim 16, wherein said at least two clamping segments have different colors, geometries or surface geometries.

19. An electric heater in accordance with claim 16, wherein said clamping segment has guide elements, which mesh with recesses provided in different pressing segments, wherein a distance between said recesses changes in a direction in which a relative motion takes place between said pressing segments and clamping segments, or each of two pressing segments has guide elements, which mesh with different recesses provided in a respective clamping segment, wherein a distance between said recesses changes in a direction in which a relative motion takes place between said pressing segments and said clamping segments.

20. An electric heater in accordance with claim 16, wherein one of at least two different recesses or one of at least two different groups of recesses is arranged at different clamping segments on a front side.

* * * * *